May 10, 1938. R. E. KASTER 2,117,175
SPIRAL SCRAPER FOR PIPE TYPE CHILLERS
Filed Feb. 11, 1937
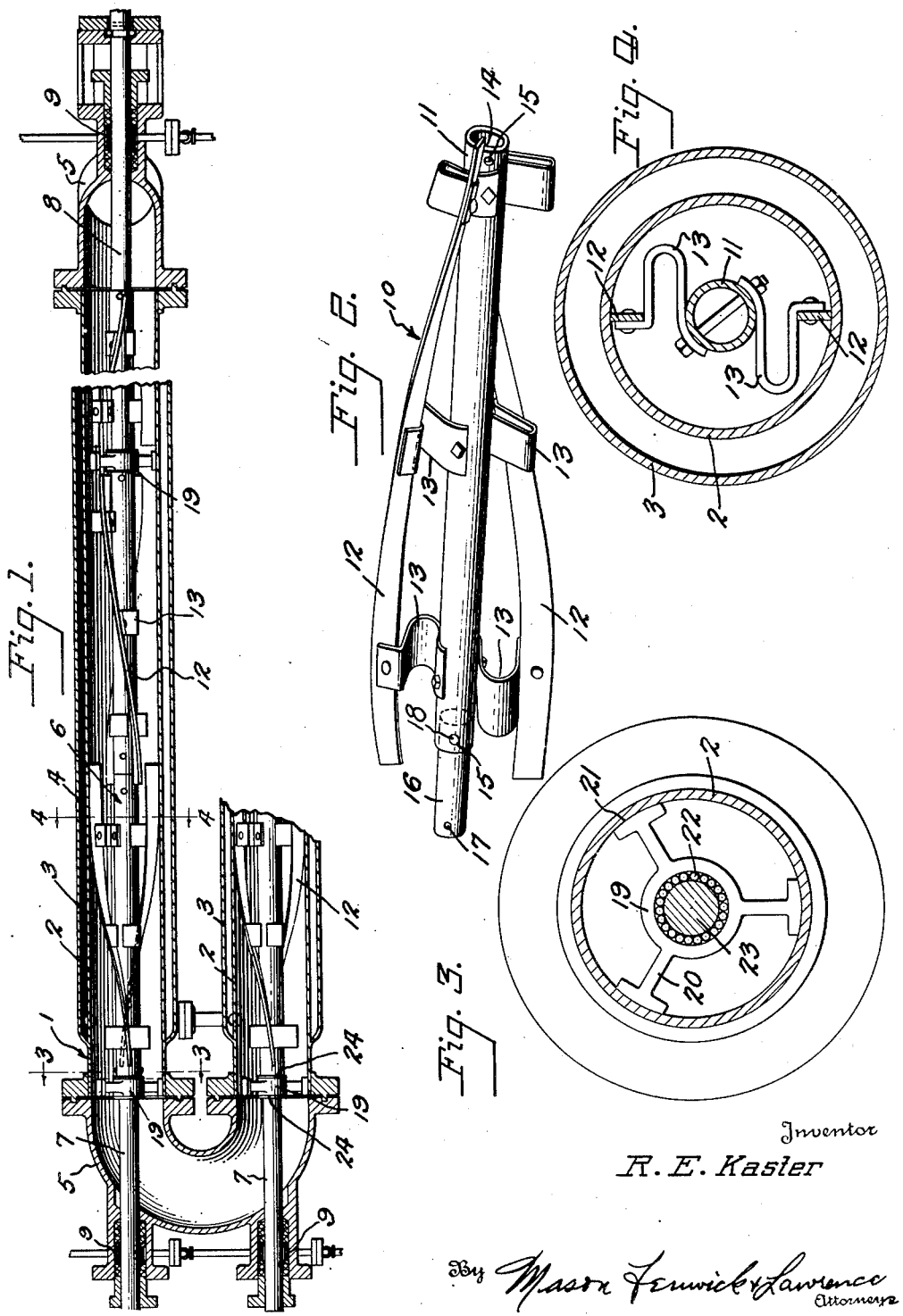
Inventor
R. E. Kasler
By Mason Fenwick & Lawrence
Attorneys Patented May 10, 1938

2,117,175

UNITED STATES PATENT OFFICE 2,117,175

SPIRAL SCRAPER FOR PIPE TYPE CHILLERS

Rudolph Edwin Kaster, Louisville, Ky., assignor to Henry Vogt Machine Co., Louisville, Ky., a corporation of Kentucky Application February 11, 1937, Serial No. 125,347

3 Claims. (Cl. 259—109)

This invention relates to spiral scrapers for pipe-type chillers and the like.

One of the objects of the invention is to provide a scraper, the blades of which bear with resilient pressure against the inner surface of the pipe, keeping it polished and free from adherent matter and in the best heat exchanging condition.

Another object of the invention is the provision of a scraper in which the spiral arrangement of the blades prevents chatter and imparts a smoother cutting edge than those of straight blades, and tending to wear any unevenness of the pipe smooth and cylindrical.

Still another object of the invention is to provide a scraper which affords the advantages attending the use of spiral blades, but which offers less resistance to the flow of fluid through the pipe and other types of scrapers except of course the longitudinally straight form.

A further object of the invention is to provide a spiral blade scraper in the form of a series of spiral bladed units, each fitting the encompassing pipe with resilient pressure throughout the length of the blades, the units being connected with some universal motion so that the series of sections can adapt itself to deviations of the pipe from true rectilinear form.

Still another object of the invention is to provide a bearing spider at intervals in the chain of coupled spiral bladed units, said spider contacting the inner wall of the pipe with a free frictional fit so that the entire scraper including the bearing spider or spiders can be drawn out endwise from the pipe for purposes of repair, replacement, etc.

Other objects of the invention will appear as the following description of a preferred and practical embodiment thereof proceeds.

In the drawing which accompanies and forms a part of the following specification and throughout the several figures of which the same characters of reference have been employed to denote identical parts:

Figure 1 is a longitudinal section through a portion of a chiller of the double pipe type showing a scraper embodying the principles of the present invention, an intermediate portion being broken away;

Figure 2 is a perspective view of one of the spiral bladed units;

Figure 3 is a diametrical cross section taken along the line 3—3 of Figure 1; and Figure 4 is a cross section taken along the line 4—4 of Figure 1.

Referring now in detail to the several figures the numeral 1 represents in general a double pipe chiller comprising a vertical tier of rectilinear and substantially horizontal pipes 2, said pipes being provided with jackets 3 defining outer tubular chambers 4 through which flows the liquid, usually a refrigerant in heat exchanging relationship to the liquid being treated within the pipe 2. As shown in Figure 1, the adjacent pipes 2 of a tier are serially connected as by the return bend 5.

In order to keep the heat exchanging efficiency of the wall of the pipes 2 at the maximum value, it is necessary to agitate the fluid passing through said pipes so that any portions of said fluid will be continually brought into contact with the surfaces of said pipes and it is also essential that the inner surfaces of said pipes be kept free from any coating of deposited or adherent matter which will interfere with the freedom of heat exchange between the fluid within the pipes 2 and that in the jacket chamber 4. Rotatable scrapers 6 are therefore provided within the pipes 2, the shaft extensions 7 and 8 of said scrapers projecting through the return bends 5 and through suitable glands 9 at opposite ends of the chiller. The shaft extensions are rotated by suitable driving means, not shown.

It will be understood that the rectilinear sections of chillers of this type may be quite long, for example, 24 feet or more in length and it is extremely difficult to maintain such lengths of pipe, extending horizontally, in truly rectilinear form. Consequently, it would be somewhat impractical to install a scraper with single blades of this great length. Therefore, the present invention contemplates the provision of a plurality of scraper units 10, one of which is shown in Figure 2 consisting of a hollow shaft 11 with spiral blades 12 arranged at angular intervals of 180° as shown. The blades are of ribbon type being narrower than the radial distance between the shaft and wall of the pipe and they are preferably of harder metal than that of the pipe. The blades are supported by stiff resilient U-shaped members 13 and are of such length as to overlap the shaft 11 by about half inch as indicated at 14.

The edges of the blades describe a truly cylindrical path when the shaft 11 is rotated and the radial distance from the axis of the shaft 11 to the edge of the blade is a little greater than the radius of the pipe 2 into which the scraper is inserted, so that the blades 11 must be squeezed together a little, compressing the resilient members 13, when the scraper is inserted in the chiller pipe 2. The edge of the blade contacts the inner surface of the pipe 2 throughout the length of the blade, but if it does not do so when first inserted, it will soon wear off the inequalities or irregularities on the inner surface of the pipe 2 so that presently the blades 12 will find a true seat against the inner surface of the pipe 2 in all positions of rotation of the blades.

The shaft 11 is formed with radial apertures 15 and adjacent scraper units are pinned together by means of a short piece of shaft 16 perforated at its ends at 17 to correspond with the adjacent end apertures of adjacent shafts 11 for receiving the bolts 18. The shaft pieces 16 are preferably loosely received in the shafts 11 and the bolts 18 also loose with respect to the apertures 15 so that there is a limited amount of lost or universal motion between adjacent scraper units. This imparts sufficient flexibility to the entire length of scraper to permit it to follow any slight deviations of the pipes 2 from truly rectilinear form. This assures that the blades of each unit throughout their entire length will maintain continuous contact with the inner walls of the pipes 2. The scraper units 10 are of any suitable length and a series of several of them may be connected together before it becomes necessary to interpose a supporting bearing.

A preferred form of bearing is shown in Figure 3 consisting of a spider 19 having arms 20 with arcuate ends 21 having a peripheral curvature corresponding with that of the inner surface of the pipes 2. The diameter of the spider is such as to make it a free sliding fit within the inner pipes. The hub of the spider is formed with an enlarged cylindrical bore in which the roller bearing 22 is retained. A stub shaft 23 is journalled in this bearing and projects on opposite sides of the spider. The extending ends of the stub shaft 23 are of such size as to freely fit within the adjacent ends of the hollow shafts 11 and cheek plates 24 on the ends of said stub shaft at opposite sides of the spider maintain the roller bearing in position. The ends of the stub shaft 23 are provided with holes which correspond to the apertures 15 when the ends of adjacent scraper units are positioned upon the ends of the stub shaft. The adjacent scraper units and stub shaft 23 are coupled by means of bolts passing through said apertures and said holes.

It will be observed from Figure 3 that the cross section of the spider 19 is made as small as possible in order to oppose as little obstruction as possible to the free flow of fluid through the pipes 2. The loose connection between the stub shaft 23 and the adjacent scraper units provides for limited universal movement between these parts.

The entire scraper as above described consists therefore of a chain or string of scraper units connected end to end with one or more of the sliding spider couplings intercalated in the chain at suitable intervals. When it is desired to remove the scraper from the inner pipes 2 for purpose of repair or replacement, it is necessary merely to free one of the shaft extensions 7 or 8 from its driving connection, unpack the glands 9 and remove one of the return bends, which having been done, the entire chain of scraper units and including the spider couplings may be drawn out endwise from the pipes 2.

The spiral arrangement of the blades 12 has the advantage that the blades will not chatter over the inner surface of the pipe 2 as might happen in the case of a longitudinal straight blade. The spiral blade also acts as an agitator and to a certain extent as an impeller of the fluid within the pipe 2 although the pitch of the spiral is made slight so as to allow the optimum freedom of flow of fluid through the pipes 2 past the scraper. In view of the continual pressure with which the spring members 13 press the blades into contact with the inner wall of the pipe 2, the inner surface of the pipe will become polished, deposited and adherent matter will be continually removed and any irregularities or inequalities on the inner surface of the pipe 2 will be worn away so that the inside of the pipe will become truly cylindrical and with a polished surface. As will be observed in Figure 1, the blades of adjacent scraper units are staggered whereby the axis of the scraper is balanced and the fact that the blades of adjacent units overlap the plane of juncture between said units assures that there will be no break in the continuity of the polished inner surface of the pipe 2.

While I have in the above description disclosed what I believe to be a preferred and practical embodiment of the invention, it will be understood to those skilled in the art that the spiral type scraper of my invention may be employed in other types of chiller than that herein illustrated and described and that the specific details of the spiral scraper and the construction and arrangement of its component parts are by way of illustration and not to be construed as limiting the scope of the invention as defined in the appended claims.

What I claim is:

1. Helical sectional scrapers for the inner walls of conduits of pipe type chillers which are characterized by relatively great length and relatively small diameter comprising a plurality of scraper sections each including a shaft section, means connecting adjacent shaft sections forming a joint with small degree of universal movement, spiral ribbon blades for each shaft section, springs supporting said blades distally from said shaft sections, said springs each comprising a U-shaped resilient member with its limbs parallel to a plane tangent to the shaft section, being secured thereto by one limb, the blade being fixed to the extremity of the other limb substantially at a right angle thereto, the open ends of said springs facing in the trailing direction with respect to the rotation of said blades.

2. Helical sectional scrapers for the inner walls of conduits including a plurality of scraper sections each comprising a shaft section, means connecting adjacent shaft sections forming a joint with small degree of universal movement, spiral ribbon blades for each shaft section, springs supporting said blades distally from said shaft sections, said springs each comprising a U-shaped resilient member with its limbs parallel to a plane tangent to the shaft section, secured thereto by one limb, the other limb having an angular lug to which the blade is fixed substantially at a right angle to said other limb, the open ends of said springs facing in the trailing direction with respect to the rotation of said blades, said blades overhanging the ends of said shaft sections, said scraper sections being angularly displaced whereby said blades mutually overlap said joint in alternate staggered relation.

3. In combination, a conduit and a helical conveyor for removing material from the inner surface of said conduit and including a shaft, a helical blade engaging the inner wall of said conduit and having its inner periphery spaced from said shaft to leave an annular passageway along said shaft, and means for yieldingly supporting said helical blade on said shaft comprising springs, each consisting of a U-shaped resilient member with its limbs parallel to a plane tangent to said shaft, being secured to said shaft by one limb, the blade being fixed to the extremity of the other limb substantially at a right angle thereto, the open ends of said springs facing in the trailing direction with respect to the rotation of said blades.

RUDOLPH E. KASTER.